Figure 1:
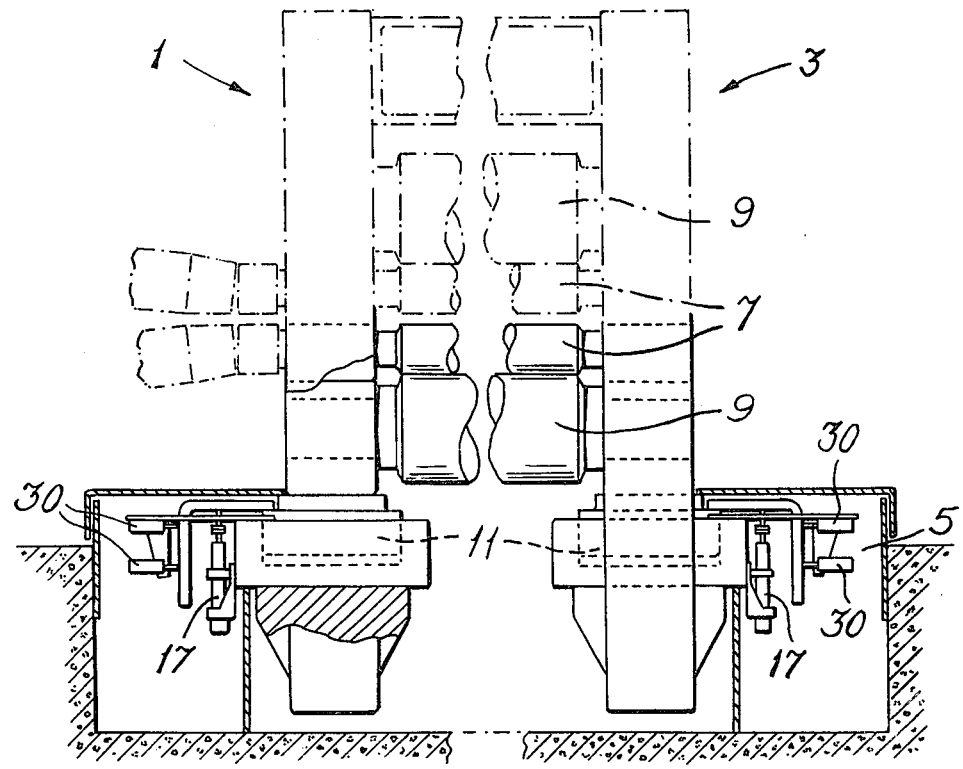

United States Patent [19]

Bathory

[11] Patent Number: 4,458,514
[45] Date of Patent: Jul. 10, 1984

[54] POSITION CONTROL OF PISTON-CYLINDER DEVICE

[75] Inventor: Bela I. Bathory, Wales Nr. Sheffield, England

[73] Assignee: Davy McKee (Sheffield) Limited, Sheffield, England

[21] Appl. No.: 471,445

[22] Filed: Mar. 2, 1983

[30] Foreign Application Priority Data

Mar. 3, 1982 [GB] United Kingdom ............... 8206294

[51] Int. Cl.³ .................... B21B 37/00; B21B 37/08; B21B 31/32; B21C 51/00
[52] U.S. Cl. .................................. 72/11; 72/21; 72/35; 72/245; 33/182; 92/5 R; 100/99
[58] Field of Search ................ 72/11, 15, 16, 21, 35, 72/245, 248, 453.14, 446, 389; 92/5; 33/182; 100/258 A, 99

[56] References Cited

U.S. PATENT DOCUMENTS

| 3,192,751 | 7/1965 | Baker ........................... 100/99 |
| 3,559,432 | 2/1971 | Rastelli ......................... 72/21 |
| 3,563,073 | 2/1971 | Fischer ......................... 100/99 |
| 3,852,984 | 12/1974 | Greenberger ................. 72/35 |
| 3,974,672 | 8/1976 | Herbst ......................... 72/35 |

FOREIGN PATENT DOCUMENTS 1295636 11/1972 United Kingdom ............... 33/182

Primary Examiner—E. Michael Combs
Assistant Examiner—Charles Rosenberg
Attorney, Agent, or Firm—Schwartz & Weinrieb

[57] ABSTRACT

A combination for accurately determining the position of the movable part of a piston-cylinder device relative to the fixed part includes a long stroke position transducer movable in the operating direction of the device; a structure movable with the piston-cylinder device and which has a part extending in the operating direction; two position transducers positioned side-by-side and their direction of movement is normal to the operating direction. The movable parts of the two position transducers bear against the part of the structure. If there is no tilting of the piston within the cylinder, then electrical signals from the two position transducers remain unchanged, but the signals are changed if the piston tilts within the cylinder.

4 Claims, 2 Drawing Figures

POSITION CONTROL OF PISTON-CYLINDER DEVICE

This invention relates to a combination which includes a piston-cylinder device and means for accurately determining displacement of the displaceable part of the device relative to the fixed part of the device.

There are many industrial applications where a piston-cylinder device is employed to move one part relative to another and in which it is necessary to accurately determine the position of the moved part relative to a stationary part. A particular, but not sole, application of the invention is to a rolling mill where at least one piston-cylinder device is used to control the gap between a pair of rolls of the mill. In such a rolling mill, a separate piston-cylinder device is usually arranged in each mill housing, at the bottom of the window, with the displaceable part of each device engaging against a bearing chock assembly at the ends of the lowermost roll. Usually, the cylinders of the piston-cylinder devices are formed in, or secured to, the housings and the pistons form the displaceable part of the device; however, the opposite is possible, the cylinders moving on the pistons which are secured to the housing.

For the control of the roll gap, it is advantageous to determine continuously the relative position of the displaceable and stationary parts of the or each piston cylinder device. Because the displaceable part of the piston-cylinder device is liable to tilt relative to the stationary part, the position measurement should be effected at the axis of the piston-cylinder device to obtain the most accurate measurement. However, the location of a position transducer within the cylinder and on its axis is prohibited by the inaccessibility of the device in that it is necessary to move the roll stack and the displaceable part of the device before the position transducer can be serviced.

It has, therefore, been proposed to use two position transducers in relation to each piston-cylinder device with the transducers disposed in a radial line through the axis of the device but on opposite sides of that axis. This has the disadvantage that one of the transducers has to be positioned on the inside of the mill stand and, in this position, it is subjected to dirt and liquids which fall upon it during operation of the mill.

It is also known for the two transducers to be positioned at different distances from, but on the same side of, the axis of the piston-cylinder device in order to determine the axial displacement of the displaceable part of the device relative to the stationary part.

The present invention resides in a combination of a piston-cylinder device of which one part is stationary and the other part is displaceable relative to the stationary part in an operating direction; a position transducer positioned outside of the piston-cylinder device and having a stationary part and a displaceable part, one of which is connected for displacement with the displaceable part of the piston-cylinder device in said operating direction; a structure connected for displacement with the displaceable part of the piston-cylinder device such that an elongate part of the structure which extends in said operating direction is displaceable in said direction; and two position transducers positioned side-by-side in said operating direction and each having a movable part movable in a direction normal to said operating direction and in engagement with said elongate part of the structure.

The two position transducers which are positioned side-by-side in the operating direction are of relatively short stroke, whereas the position transducer connected for displacement with the displaceable part of the piston-cylinder device has to have a stroke which is comparable with the stroke of the piston-cylinder device. If, in use, the two position transducers positioned side-by-side in the operating direction indicate that the elongate part of the structure is displaceable in the operating direction, then the position transducer connected for displacement with the displaceable part of the piston-cylinder device produces an output which is an accurate representation of the displaceable part of the piston-cylinder device. However, if the two position transducers positioned side-by-side in the operating direction indicate that there is tilting of the displaceable part within the stationary part of the piston-cylinder device, by taking into account the separation of the positions of engagement of the two position transducers on the elongate part of the structure and the position of the elongate part of the structure relative to the longitudinal axis of the displaceable part of the piston-cylinder device, then a correction factor can be determined which is added or subtracted to the reading from the position transducer in order to take into account the tilting movement.

Figure 2:
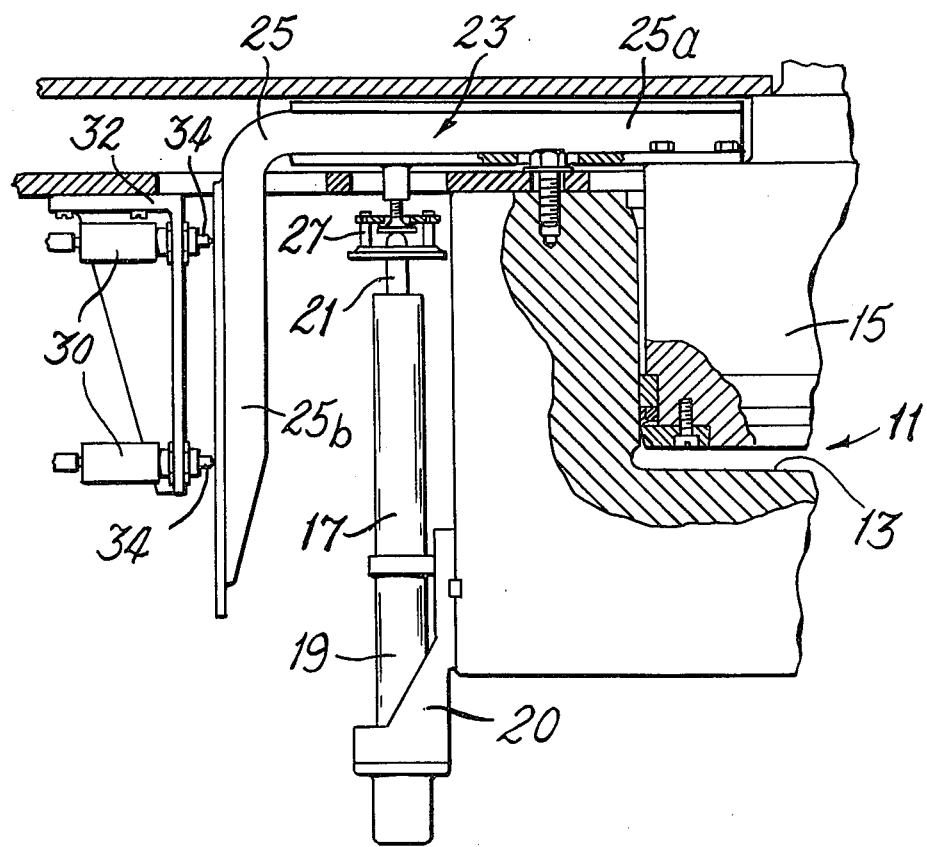

In order that the invention may be more readily understood, it will now be described, by way of example only, with reference to the accompanying drawings, in which:

FIG. 1 is a side elevation, partly in section, of a rolling mill stand showing the apparatus of the present invention, and FIG. 2 is an enlargement of part of the apparatus shown in FIG. 1.

FIG. 1 shows a rolling mill stand having a pair of spaced apart housings 1, 3, mounted partly in a pit 5. A pair of work rolls 7 and a pair of back-up rolls 9 are each rotatably mounted in bearing chock assemblies which are fitted one to each end of the roll. The assemblies at one corresponding end of the rolls are located in a window defined by the housing 1 and the assemblies at the other corresponding end of the rolls are located in a window defined by the housing 3.

In order to adjust the gap between the work rolls 7, a hydraulically operated piston-cylinder device 11 (see particularly FIG. 2) is positioned at the bottom of each housing window. When the devices are actuated, they serve to raise and lower the bearing chock assemblies of the bottom back-up roll and the bottom work roll in the housing windows. The piston-cylinder devices each comprise a stationary cylinder 13, sometimes defined by the housing, with a piston 15 displaceable in the cylinder. To determine the position of the piston with respect to the cylinder of each device, a long stroke position transducer 17 is arranged outside the piston-cylinder device and on the outside of the mill housing. The longitudinal axis of the transducer is parallel to the direction of displacement of the movable part of the piston-cylinder device, said direction being referred to as the operating direction. The position transducer has a stationary cylinder part 19 which is mounted by means of a bracket 20 on to the outside wall of the cylinder 19. A displaceable part 21 of the transducer is displaceable in the direction of the length of the transducer and an electrical signal is produced by the transducer which is representative of the position of the part 21 in the operating direction relative to the cylinder part 19.

A structure 23 includes an L-shaped bracket 25 which is bolted at one end to the piston 15 of the piston-cylinder device. The bracket has a first limb 25a which extends normal to the operating direction of the piston-cylinder device and an elongate limb 25b which extends in the operating direction. The bracket is connected for displacement with the displaceable part of the piston-cylinder device so that, in use, the elongate limb 25b is displaceable in the operating direction of the piston-cylinder device. The movable part 21 of the transducer 17 is connected by a way of a coupling 27 to the limb 21 of the bracket so that, as the piston 15 is displaced in the operating direction, the part 21 of the position transducer is displaceable with the piston 15 in the operating direction.

A pair of short stroke position transducers 30 are mounted on a stationary support device 32 in side-by-side relation in the operating direction. Each transducer has a movable part 34 which is movable in a direction normal to the operating direction of the piston-cylinder device and which bears against the elongate limb 25b of the structure 25.

Assuming that the limbs 25a and 25b of the structure 25 are at right angles to each other and the piston 15 is aligned with the bore of the cylinder 13, then the elongate limb 25b of the structure 15 extends parallel to the operating direction of the piston-cylinder device and the electrical output from each of the two position transducers 30 should be the same or bear some fixed relation to each other. If the piston 15 is now moved in the operating direction, the elongate limb 25b also moves in the operating direction and the electrical output from each of the position transducers 30 should not change. The output from the position transducer 17, however, is representative of the position of the piston 5 with respect to the cylinder 13. If, however, as sometimes occurs, the piston 15 tilts in the cylinder 13, so that the piston is displaced slightly out of the operating direction, then the elongate limb 25b will be deflected out of the operating direction so that the displacement of the two position transducers 30 will not now be the same or bear the same fixed relation. This will immediately indicate that tilting has taken place and that the output from the position transducer 17 is not strictly accurate.

The separation of the longitudinal axes of the two position transducers 30 is known and the position of the elongate limb 25b relative to the axis of the piston 15 is also known and, from this information, a compensating or correcting signal can be obtained which compensates for the tilting of the piston 15 and this signal is added or subtracted, as the case may be, to the output from the transducer 17 to give a signal which is correctly representative of the position of the piston 15 in the cylinder 13.

What I claim as my invention and desire to secure by Letters Patent is:

1. The combination of a piston-cylinder device of which no part is stationary and the other is displaceable relative to the stationary part in an operating direction; a position transducer positioned outside of the piston-cylinder device and having a stationary part and a displaceable part, one of which is connected for displacement with the displaceable part of the piston-cylinder device in said operating direction; a structure connected for displacement with the displaceable part of the piston-cylinder device such that an elongate part of the structure which extends in said operating direction is displaceable in said direction; and two position transducers positioned side-by-side in said operating direction and each having a movable part movable in a direction normal to said operating direction and in engagement with said elongate part of the structure.

2. The combination as claimed in claim 1, wherein the structure includes an L-shaped bracket having a pair of limbs which are substantially at right angles to each other and said elongate part of the structure which extends in the operating direction is one limb of the bracket.

3. The combination as claimed in claim 2, wherein the displaceable part of said one position transducer is connected to the other limb of the L-shaped bracket.

4. The combination as claimed in claim 1, wherein the piston-cylinder device is positioned in the window of the housing of a rolling mill stand with the displaceable part of the device acting against a bearing chock assembly of the lowermost roll of the mill stand and the transducers are located at the outside of the housing.

* * * * *